US012530753B2

United States Patent
Varadarajan et al.

(10) Patent No.: US 12,530,753 B2
(45) Date of Patent: Jan. 20, 2026

(54) METHOD AND ELECTRONIC DEVICE FOR ESTIMATING PERCEPTUAL QUALITY OF HIGH DYNAMIC RANGE (HDR) IMAGES

(71) Applicant: SAMSUNG ELECTRONICS CO., LTD., Suwon-si (KR)

(72) Inventors: Srenivas Varadarajan, Karnataka (IN); Anamika Sharma, Karnataka (IN); Kaustav Chanda, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

(21) Appl. No.: 18/475,568

(22) Filed: Sep. 27, 2023

(65) Prior Publication Data

US 2024/0320809 A1    Sep. 26, 2024

(30) Foreign Application Priority Data

Mar. 24, 2023    (IN) .............................. 202341021249

(51) Int. Cl.
*G06K 9/00* (2022.01)
*G06T 5/90* (2024.01)
(Continued)

(52) U.S. Cl.
CPC .............. *G06T 5/90* (2024.01); *G06T 7/0002* (2013.01); *G06T 7/11* (2017.01); *G06T 7/13* (2017.01);
(Continued)

(58) Field of Classification Search
CPC . G06T 5/90; G06T 7/0002; G06T 7/11; G06T 7/13; G06T 7/20; G06T 2207/20208; G06T 2207/30168; G06T 5/94
See application file for complete search history.

(56) References Cited

U.S. PATENT DOCUMENTS 5,828,793 A  * 10/1998 Mann ........................ G06T 5/40
                                                        358/448
8,081,227 B1 * 12/2011 Kim ..................... H04N 23/633
                                                        348/211.3
(Continued)

FOREIGN PATENT DOCUMENTS

CN      104616294         5/2015
CN      105894484 B  *  3/2017    ............... G06T 5/50
(Continued)

OTHER PUBLICATIONS

The State of the Art in HDR Deghosting: A Survey and Evaluation, Okan Tarhan Tursun et al., Eurographics, 2015, pp. 683-707 (Year: 2015).*

(Continued)

*Primary Examiner* — Jayesh A Patel
(74) *Attorney, Agent, or Firm* — Morgan, Lewis & Bockius LLP

(57) ABSTRACT

A method and apparatus for estimating a perceptual quality of a High Dynamic Range (HDR) image includes dividing an image into at least one static region and at least one dynamic region, weighting at least one artifact in the at least one static region and the at least one dynamic region through a visual saliency map, computing at least one edge preservation score based on a Static HDR Quality Index (SQI), a Dynamic HDR Quality Index (DQI) and the at least one weighted artifact, generating an output HDR quality metric by modulating the at least one computed edge preservation score on an input HDR quality metric, and estimating the perceptual quality of the HDR image based on the generated output HDR quality metric.

20 Claims, 4 Drawing Sheets

(51) Int. Cl.
- *G06T 7/00* (2017.01)
- *G06T 7/11* (2017.01)
- *G06T 7/13* (2017.01)
- *G06T 7/20* (2017.01)

(52) U.S. Cl.
CPC ...... *G06T 7/20* (2013.01); *G06T 2207/20208* (2013.01); *G06T 2207/30168* (2013.01)

(56) References Cited

U.S. PATENT DOCUMENTS

| | | | |
|---|---|---|---|
| 8,743,291 B2 | 6/2014 | Li et al. | |
| 8,760,578 B2 | 6/2014 | Li | |
| 9,794,554 B1* | 10/2017 | Le Callet | H04N 17/02 |
| 9,922,411 B2* | 3/2018 | Aydin | H04N 19/00 |
| 10,210,433 B2 | 2/2019 | Jiang et al. | |
| 10,771,820 B2 | 9/2020 | Lee et al. | |
| 10,860,034 B1* | 12/2020 | Ziyaee | G06N 3/045 |
| 2007/0242900 A1* | 10/2007 | Chen | H04N 23/741 |
| | | | 382/294 |
| 2010/0150473 A1* | 6/2010 | Kwon | G06T 5/50 |
| | | | 382/284 |
| 2011/0211732 A1* | 9/2011 | Rapaport | G06F 3/1454 |
| | | | 382/173 |
| 2013/0083838 A1* | 4/2013 | Touze | H04N 19/33 |
| | | | 375/E7.026 |
| 2017/0193639 A1* | 7/2017 | Dai | G06F 18/23211 |
| 2017/0236260 A1* | 8/2017 | Budagavi | G06T 5/50 |
| | | | 382/275 |
| 2018/0089799 A1* | 3/2018 | Johnson | G06T 3/403 |
| 2018/0310008 A1* | 10/2018 | Kopietz | H04N 19/85 |
| 2021/0129868 A1* | 5/2021 | Nehmadi | B60W 60/001 |
| 2022/0101123 A1* | 3/2022 | Kim | G06T 7/20 |
| 2022/0166920 A1* | 5/2022 | Sivan | H04N 23/951 |
| 2023/0269487 A1* | 8/2023 | Kwong | G06T 5/50 |
| | | | 348/229.1 |
| 2024/0303833 A1* | 9/2024 | Boardman | G06T 7/344 |

FOREIGN PATENT DOCUMENTS

| | | | | |
|---|---|---|---|---|
| CN | 109345525 | | 2/2019 | |
| CN | 109345525 A | * | 2/2019 | ........... G06T 7/0002 |
| EP | 3680858 A1 | * | 7/2020 | ............... G06T 7/74 |
| JP | 2020503587 A | * | 1/2020 | ............. H04N 23/70 |
| KR | 10-1846743 | | 4/2018 | |
| WO | WO-2022133381 A1 | * | 6/2022 | ............. G06T 7/246 |

OTHER PUBLICATIONS

Perceptual Evaluation for Multi-Exposure Image Fusion of Dynamic scenes, Yuming Fang et al., IEEE, 2020, pp. 1127-1138 (Year: 2020).*

Edge-Based Objective Evaluation of Image Quality, Boban P. Bondzulic et al., IEEE, 2011, pp. 3305-3308 (Year: 2011).*

An Objective to Deghosting Quality Metric for HDR Images, Okan Tarhan Tursun et al., Eurographics, 2016, pp. 1-15 (Year : 2016).*

Objective Pixel-Level Image Fusion Performance Measure, C Xydeas et al., SPIE, 2000, pp. 89-98 (Year: 2000).*

Blind High Dynamic Range Image Quality Assessment Using Deep Learning, Sen Jia et al., IEEE, 2017, pp. 765-769 (Year: 2017).*

Lavoue, Guillaume et al., "Quality Assessment in Computer Graphics", Visual Signal Quality Assessment, pp. 243-286, Oct. 16, 2014.

Bondulic, Boban P., et al., "Edge-Based Objective Evaluation of Image Quality 2011 18th IEEE International Conference on Image Processing", Sep. 11-14, 2011.

Zhang et al., Non-Shift Edge Based Ratio (NSER): an Image Quality Assessment Metric Based on Early Visions Features, IEEE Signal Processing Letters, vol. 18, No. 5, May 2011.

Suthaharan et al., "A New Quality Metric Based on Just-Noticeable Difference, Perceptual Regions, Edge Extraction and Human Vision", Can. J. Elect. Comput. Eng., vol. 30, No. 2, Spring 2005.

Fang, Yuming et al., "Perceptual Evaluation for Multi-Exposure Image Fusion of Dynamic Scenes", IEEE Transactions on Image Processing, vol. 29, 2020.

Tursun, et al., "An Objective Deghosting Quality Metric for HDR Images", Eurographics 2016, vol. 35, No. 2.

Hossny, M., et al., "Comments on 'Information Measure for Performance of Image Fusion", Electronics Letters, Aug. 28, 2008, vol. 44, No. 18.

Xydeas C., et al., "Objective Image Fusion Performace Measure", In Sensor Fusion: Architecture, Algorithms, and Applications IV, Proceedings of SPIE, vol. 4051 (2000).

Wang, Peng-Wei, et al., "A Novel Image Fusion Metric Based on Multi-Scale Analysis", 2008 9th International Conference on Signal Processing.

Wang et al., Performances Evaluation of Image Fusion Techniques Based on Nonlinear Correlation Measurement, IMTC 2004—Instrumentation and Measurement Technology Conference, Como, Italy, May 18-20, 2004.

Sen Jia et al., "Blind high dynamic range image quality assessment using deep learning", 2017 IEEE International Conference on Image Processing (ICIP).

* cited by examiner

METHOD AND ELECTRONIC DEVICE FOR ESTIMATING PERCEPTUAL QUALITY OF HIGH DYNAMIC RANGE (HDR) IMAGES

CROSS-REFERENCE

The present application claims priority under 35 U.S.C. § 119 to Indian patent application Ser. No. 202341021249 filed on Mar. 24, 2023 in the Indian Patent Office, the entire disclosure of which is incorporated by reference.

FIELD

The present disclosure relates to image processing methods and systems, and more particularly to a method and an electronic device for estimating a perceptual quality of a High Dynamic Range image.

DISCUSSION

High Dynamic Range (HDR) imaging is important for capturing scenes with widely varying illuminations to create high contrast photos. A single exposure time is not suitable for both bright regions and dark regions in the scene. Exposure Bracketing is a popular techniques used to capture several Low Dynamic Range (LDR) images and fuse the LDR images to create an HDR image. Such fusion of LDR images can lead to loss of details in static regions and introduce ghosting artifacts in dynamic regions. Methods and systems for quantifying a perceptual quality of HDR images are desired. Moreover, methods and systems for estimating the quality of HDR images using a metric consistent with quality as perceived by human visual systems (HVS) is desired.

SUMMARY

Embodiments of the present disclosure may provide methods and electronic devices for estimating a perceptual quality of a High Dynamic Range (HDR) image. Embodiments of the present disclosure may evaluate output quality in any area where HDR imaging is used, such as smartphones, driving systems, and biomedical applications. Embodiments of the present disclosure may divide the HDR image into static regions and dynamic regions. Embodiments of the present disclosure may estimate an amount of preserved edges in the static regions through a Static HDR Quality Index (SQI). Embodiments of the present disclosure may estimate an amount of ghosting in the dynamic regions through a Dynamic HDR Quality Index (DQI). Embodiments of the present disclosure may weight artifacts in the static regions and the dynamic regions through a visual saliency map to compute an edge preservation score. Embodiments of the present disclosure may modulate an input or baseline HDR quality metric through the edge preservation score to form a modulated or output HDR quality metric.

An embodiment of the present disclosure includes a method for estimating a perceptual quality of an HDR image. The method includes dividing, by an electronic device, an image into at least one static region and at least one dynamic region. Further, the method includes determining, by the electronic device, at least one preserved edge in the at least one static region based on a static HDR quality index (SQI). Further, the method includes determining, by the electronic device, an amount of ghosting in the at least one dynamic region based on a dynamic HDR quality index (DQI). Further, the method includes weighting, by the electronic device, the at least one artifact in the at least one static region and the at least one dynamic region through a visual saliency map. Further, the method includes computing, by the electronic device, the at least one edge preservation score based on the SQI, the DQI and the visual saliency map. Further, the method includes generating, by the electronic device, an output HDR quality metric by modulating the at least one computed edge preservation score on an input HDR quality metric. Further, the method includes estimating, by the electronic device, the perceptual quality of the HDR image based on the generated output HDR quality metric.

In an embodiment, the method may include feeding back, by the electronic device, the generated output HDR quality metric for tuning at least one parameter to optimize the perceptual quality of the HDR image. In an embodiment, the SQI may determine a HDR blur through at least one lost LDR edge in the at least one static region of the HDR image due to one of an over exposure or an under exposure.

In an embodiment, the DQI may determine a HDR ghosting through additional edges in the at least one dynamic region of the HDR image due to a foreground motion. In an embodiment, the visual saliency map may be used to weigh an edge-cost in the HDR image compared to at least one the LDR image before computing the edge preservation score. The edge-cost corresponds to edge loss and a presence of extra edges in the HDR image.

In an embodiment, the SQI may be generated by accumulating all edges present in the at least one static region of an input LDR sequence into one edge map, detecting a blur in an output HDR image by computing a number of edge pixels in the accumulated edges that are not found in the output HDR image at corresponding location, computing the blur as a fraction of edge pixels in the accumulated edge map that are not present in the output HDR image, and subtracting the computed blur ratio from a predefined value to obtain the SQI, wherein the predefined value is 1.

In an embodiment, the DQI may be generated by counting a number of edge pixels in the at least one dynamic regions for each of LDR images in the input sequence, determining the LDR image containing a maximum number of edges, accumulating the edges from the LDR image and the edges in the output HDR image, detecting the at least one artifact as extra edges present in the output HDR image that are not present in the input LDR image with the maximum number of edges, and computing DQI as the maximum number of edge pixels in input sequence divided by the number of edges in the accumulated edge map, wherein the computation is always less than or equal to one, where the computation is equal to one if there are no extra edge pixels in the output HDR image.

An embodiment of the present disclosure includes an electronic device having a perceptual quality and estimation controller coupled with a processor and a memory. The perceptual quality and estimation controller is configured to divide an image into at least one static region and at least one dynamic region. Further, the perceptual quality and estimation controller is configured to determine at least one preserved edge in the at least one static region based on a static HDR quality index (SQI). Further, the perceptual quality and estimation controller is configured to determine an amount of ghosting in the at least one dynamic region based on a dynamic HDR quality index (DQI). Further, the perceptual quality and estimation controller is configured to weight the at least one artifact in the at least one static region and the at least one dynamic region through a visual saliency map.

Further, the perceptual quality and estimation controller is configured to compute at least one edge preservation score based on the SQI and the DQI. Further, the perceptual quality and estimation controller is configured to generate an output HDR quality metric by modulating the at least one computed edge preservation score on an input HDR quality metric (i.e., existing HDR quality metric). Further, the perceptual quality and estimation controller is configured to estimate the perceptual quality of the HDR image based on the generated output HDR quality metric.

An embodiment of the present disclosure includes a perceptual quality and estimation control circuit configured to process a plurality of low dynamic range (LDR) images of different exposures and generate a high dynamic range (HDR) image, the control circuit comprising: a dynamic region detection circuit configured to divide an image into at least one static region and at least one dynamic region; a static HDR quality index (SQI) circuit configured to determine at least one preserved edge in the at least one static region based on an SQI; a dynamic HDR quality index (DQI) circuit configured to determine an amount of ghosting in the at least one dynamic region based on a DQI; a visual saliency prediction circuit configured to weight at least one artifact in the at least one static region and the at least one dynamic region through a visual saliency map; a combinatorial circuit configured to compute at least one edge preservation score based on the SQI and the DQI; a convolutional circuit configured to generate an output HDR quality metric by modulating the at least one computed edge preservation score on an input HDR quality metric; and a feedback circuit configured to estimate and compensate the perceptual quality of the HDR image based on the generated output HDR quality metric.

In an embodiment of a perceptual quality and estimation control circuit, the feedback circuit may be configured to feedback the generated output HDR quality metric for tuning at least one parameter to optimize the perceptual quality of the HDR image. In an embodiment of a perceptual quality and estimation control circuit, the SQI circuit may determine an HDR blur through at least one lost LDR edge in the at least one static region of the HDR image due to one of an overexposure or an underexposure.

In an embodiment of a perceptual quality and estimation control circuit, the DQI circuit may determine an HDR ghosting through additional edges in the at least one dynamic region of the HDR image due to a foreground motion, wherein the visual saliency prediction circuit weighs an edge-cost in the HDR image compared to at least one of the plurality of LDR images before computing the edge preservation score, wherein the edge-cost corresponds to edge loss and a presence of extra edges in the HDR image.

In an embodiment of a perceptual quality and estimation control circuit, the SQI circuit may comprise: an accumulator configured to accumulate all edges present in the at least one static region of an input LDR sequence into one edge map; an edge detector configured to detect a blur in an output HDR image by computing a number of edge pixels in the accumulated edges that are not found in the output HDR image at corresponding location; and a processor configured to compute the blur as a fraction of edge pixels in the accumulated edge map that are not present in the output HDR image, and subtract the computed blur ratio from a predefined value to obtain the SQI.

In an embodiment of a perceptual quality and estimation control circuit, the DQI circuit may comprise: a counter configured to count a number of edge pixels in the at least one dynamic regions for each of LDR images in the input sequence; a maximizer configured to determine the LDR image containing a maximum number of edges; an accumulator configured to accumulate the edges from the LDR image and the edges in the output HDR image; an edge detector configured to detect the at least one artifact as extra edges present in the output HDR image that are not present in the input LDR image with the maximum number of edges; and a processor configured to compute the DQI as the maximum number of edge pixels in the plurality of LDR images divided by the number of edges in the accumulated edge map.

These and other embodiments of the present disclosure will be better appreciated and understood when considered in conjunction with the following description and the accompanying drawings. It should be understood, however, that the following descriptions, while indicating embodiments and details thereof, are given by way of illustration without limitation thereto. Various changes and modifications may be made within the scope of the illustrative embodiments provided herein without departing from the spirit thereof, and the scope of the present disclosure shall include all such variations.

BRIEF DESCRIPTION OF THE DRAWINGS

Embodiments are illustrated in the accompanying drawings, throughout which like or corresponding reference indicia may indicate like or corresponding parts in the various figures. The illustrative embodiments provided herein will be better understood from the following description with reference to the accompanying drawings, in which.

DETAILED DESCRIPTION

Figure 1:
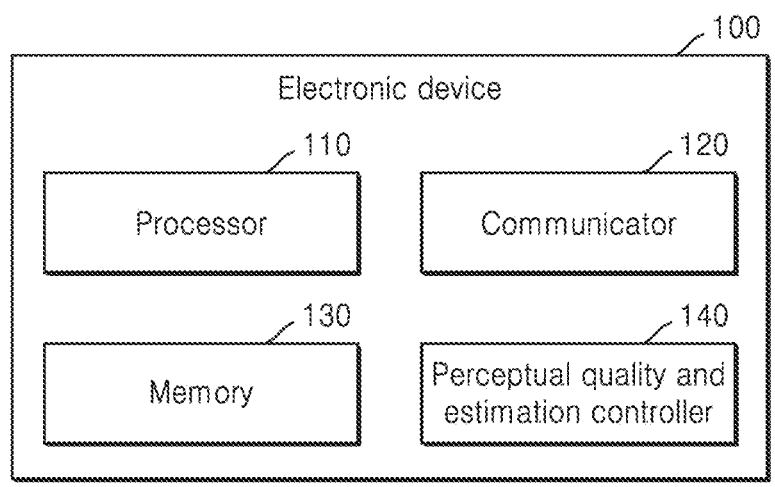
FIG. 1 is a block diagram illustrating various hardware components of an electronic device according to an embodiment of the present disclosure.

Illustrative embodiments of the present disclosure are explained more fully with reference to non-limiting examples that are illustrated in the accompanying drawings and detailed in the following description. Descriptions of well-known components and processing techniques may be omitted so as to not unnecessarily obscure the embodiments herein. The description herein is intended to facilitate an understanding of ways in which the illustrative embodiments herein can be practiced, and to further enable those of ordinary skill in the pertinent art to practice the invention by means of the disclosed or other embodiments thereof. Accordingly, this disclosure is provided by way of example and should not be construed as limiting the scope of the invention.

An embodiment described herein may provide a method for estimating a perceptual quality of an HDR image. The method includes dividing, by an electronic device, an image into at least one static region and at least one dynamic region. Further, the method includes determining, by the electronic device, at least one preserved edge in the at least one static region based on an SQI. Further, the method includes determining, by the electronic device, an amount of ghosting in the at least one dynamic region based on a DQI. Further, the method includes weighting, by the electronic device, the at least one artifact in the at least one static region and the at least one dynamic region through a visual saliency map. Further, the method includes computing, by the electronic device, the at least one edge preservation score based on the SQI and the DQI. Further, the method includes generating, by the electronic device, an output HDR quality metric by modulating the at least one computed edge preservation score on an input HDR quality metric. Further, the method includes estimating, by the electronic device, the perceptual quality of the HDR image based on the generated output HDR quality metric.

The disclosed method can be used in any field or area where High Dynamic Range (HDR) imaging is used. Such fields may include consumer mobile phones for photography and video conferencing, Advanced Driver Assistance Systems (ADAS) and Autonomous Driving Systems for rearview and side-view perception, and Bio-medical imaging, without limitation thereto. The disclosed method can be used for lossy optimizations of HDR techniques deployed in the electronic device with optimized performance, power usage, and/or area reduction.

The disclosed method need not utilize a Convolutional Neural Network (CNN) to evaluate HDR quality of important patches predicted by the visual saliency map. The disclosed method uses edge-based metrics to evaluate the HDR quality. In the disclosed method, an edge based ratio may be used to quantify ghosting in the HDR images. The disclosed method can act as feedback for quality benchmarking of the HDR techniques, as well as for the parameter tuning of existing HDR techniques. The visual saliency map assists in quantifying the importance of edge-artifacts. The DQI improves on existing metrics by increasing sensitivity to the ghosting artifacts. The disclosed method may utilize low-cost edge-detection in LDR and HDR images, which can be accelerated by hardware (HW) accelerators.

Referring now to the drawings, and more particularly to FIGS. 1 through 4, where similar or corresponding reference characters may denote similar or corresponding features consistently throughout the figures, illustrative embodiments are shown ad described by way of example.

FIG. 1 shows various hardware components of an electronic device (100), according to an embodiment as disclosed herein. The electronic device (100) can be, for example, but is not limited to a laptop, a smart phone, a desktop computer, a notebook, a Device-to-Device (D2D) device, a vehicle to everything (V2X) device, a foldable phone, a smart TV, a tablet, an immersive device, and/or an internet of things (IoT) device. In an embodiment, the electronic device (100) includes a processor (110), a communicator (120), a memory (130), and a perceptual quality and estimation controller (140). The processor (110) is coupled with the communicator (120), the memory (130), and the perceptual quality and estimation controller (140).

The perceptual quality and estimation controller (140) divides an image (e.g., an LDR image or the like) into one or more static region(s) and one or more dynamic region(s). Further, the perceptual quality and estimation controller (140) determines one or more preserved edge(s) in the one or more static region(s) based on a Static HDR Quality Index (SQI). The SQI determines an HDR blur through at least one lost LDR edge in the one or more static region(s) of the HDR image due to at least one of an over exposure or an under exposure.

In an embodiment, the SQI is generated by accumulating all edges present in the one or more static region(s) of an input LDR sequence into one edge map, detecting a blur in an output HDR image by computing a number of edge pixels in the accumulated edges that are not found in the output HDR image at corresponding locations, computing the blur as a fraction of edge pixels in the accumulated edge map that are not present in the output HDR image, and subtracting the computed blur ratio from a predefined value to obtain the SQI, wherein the predefined value may be 1.

In an example, the below operations indicate the determination of the SQI.

HDR Image Edge Map in the one or more static region(s)→$ES_{HDR}$

LDR-Image Edge Maps in the one or more static region(s)→$ES_{LDR\_i}$ where $i \in (0,N)$ HDR Blur is quantified through lost LDR edges in the one or more static region(s) of the HDR image due to overexposure and/or underexposure, as set forth in equations 1 through 3:

$$E_{LDR} = \bigcup_{i=1}^{N} ES_{LDR\_i} \qquad \text{(Eqn. 1)}$$

$$\text{Blur} = \frac{\sum (E_{LDR\_combined} \,\&(! \, ES_{HDR}))}{\sum E_{LDR\_Combined}} \qquad \text{(Eqn. 2)}$$

$$SQI = 1 - \text{Blur} \qquad \text{(Eqn. 3)}$$

Further, the perceptual quality and estimation controller (140) determines an amount of ghosting in the one or more dynamic region(s) based on a Dynamic HDR Quality Index (DQI). The DQI determines an HDR ghosting through additional edges in the one or more dynamic region(s) of the HDR image due to a foreground motion.

In an embodiment, the DQI is generated by counting a number of edge pixels in the one or more dynamic region(s) for each of the LDR images in the input sequence, determining the LDR image containing a maximum number of edges, accumulating the edges from the LDR image and the edges in the output HDR image, detecting the one or more artifact(s) as extra edges present in the output HDR image that are not present in the input LDR image with the maximum number of edges, and computing DQI as the maximum number of edge pixels in the input sequence divided by the number of edges in the accumulated edge map, wherein the computation is always less than or equal to one, where the computation is equal to one if there are no extra edge pixels in the output HDR image.

In an example, the below operations indicate the determination of the DQI.

HDR Image Edge Map in the one or more dynamic region(s)→$ED_{HDR}$

LDR-Image Edge Maps in the one or more dynamic region(s)→$ED_{LDR\_i}$ where $i \in (0,N)$ HDR Ghosting is quantified through additional LDR edges in Dynamic Regions of HDR image due to fast foreground motion, as set forth in equations 4 through 6:

$$BestLDRIndex = \text{argmax}\left(\sum_{i=1}^{N} ED_{LDR\_i}\right) \qquad \text{(Eqn. 4)}$$

-continued $$ED_{LDR\_best} = ED_{LDR\_BestLDRIndex} \quad \text{(Eqn. 5)}$$

$$DQI = \frac{\sum ED_{LDR\_best}}{\sum (ED_{HDR} \cup ED_{LDR\_best})} \quad \text{(Eqn. 6)}$$

Further, the perceptual quality and estimation controller (140) weights the one or more artifact(s) and/or metrics in the one or more static region(s) and the one or more dynamic region(s) through a visual saliency map. The visual saliency map is used to weigh an edge-cost in the HDR image compared to at least one LDR image before computing the edge preservation score. The edge-cost corresponds to edge loss and a presence of extra edges in the HDR image. The one or more weighted artifact(s) and/or quality metrics is determined by combining the DQI and the SQI scores using a percentage of static pixels in the HDR image.

Further, the perceptual quality and estimation controller (140) computes the one or more edge preservation score(s) based on the SQI, the DQI and the one or more weighted artifact(s).

In an example, the user of the electronic device (100) may provide a higher weight ($\beta > 1$) to both SQI and DQI metrics in the regions with high saliency scores, as set forth in equations 7 through 15:

For Salient Regions:

$$SQI_{sal} = SQI * \beta \quad \text{(Eqn. 7)}$$

$$DQI_{sal} = DQI * \beta \quad \text{(Eqn. 8)}$$

For Non-Salient Regions:

$$SQI_{non\_sal} = SQI \quad \text{(Eqn. 9)}$$

$$DQI_{non\_sal} = DQI \quad \text{(Eqn. 10)}$$

$$S = \% \text{ salient pixels} \quad \text{(Eqn. 11)}$$

$$SQI_{net} = S * SQI_{sal} + (1 - S) * SQI_{non\_sal} \quad \text{(Eqn. 12)}$$

$$DQI_{net} = S * DQI_{sal} + (1 - S) * DQI_{non\_sal} \quad \text{(Eqn. 13)}$$

$$W = \% \text{ static pixels} \quad \text{(Eqn. 14)}$$

$$EdgePreservationScore = W * SQI_{net} + (1 - W) * DQI_{net} \quad \text{(Eqn. 15)}$$

Further, the perceptual quality and estimation controller (140) generates an output HDR quality metric by modulating the one or more computed edge preservation score(s) on an input HDR quality metric (e.g., a baseline HDR quality metric). Further, the perceptual quality and estimation controller (140) estimates the perceptual quality of the HDR image based on the generated output HDR quality metric. In an example, the disclosed HDR quality is as set forth in equation 16:

HDR Quality=
(Baseline_HDR_Quality*EdgePreservationScore) (Eqn. 16)

Further, the perceptual quality and estimation controller (140) feeds back the generated output HDR quality metric for tuning the one or more parameter(s) (e.g., brightness, aspect ratio and/or the like) to optimize the perceptual quality of the HDR image.

The perceptual quality and estimation controller (140) may be implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more interfaces or networks. The memory (130) also stores instructions to be executed by the processor (110). The memory (130) may include non-volatile storage elements. Examples of such non-volatile storage elements may include magnetic hard discs, optical discs, floppy discs, flash memories, or forms of Electronically PROgrammable Memories (EPROM) or Electronically Erasable and PROgrammable Memories (EEPROM). In addition, the memory (130) may, in some examples, be considered a non-transitory storage medium. The term "non-transitory" may indicate that the storage medium is not embodied in a carrier wave or a propagated signal. However, the term "non-transitory" should not be interpreted as meaning that the memory (130) is non-movable. In certain examples, a non-transitory storage medium may store data that can, over time, change, such as in a Random Access Memory (RAM) or cache.

Further, at least one of the pluralities of modules and/or controller may be implemented through an Artificial Intelligence (AI) model using a data driven controller. The data driven controller can be a Machine Learning (ML) model based controller and/r an AI model based controller. A function associated with the AI model may be performed through the non-volatile memory, the volatile memory, and the processor (110). The processor (110) may include one or a plurality of processors. The one or a plurality of processors may include a general purpose processor, such as a central processing unit (CPU), an application processor (AP), a graphics-only processing unit such as a graphics processing unit (GPU), a visual processing unit (VPU), an AI-dedicated processor such as a neural processing unit (NPU), and/or the like.

The one or a plurality of processors may control the processing of the input data in accordance with a predefined operating rule or AI model stored in the non-volatile memory and/or the volatile memory. The predefined operating rule or artificial intelligence model may be provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/or may be implemented through a separate server and/or system.

The AI model may comprise of a plurality of neural network layers. Each layer has a plurality of weight values, and performs a layer operation through calculation of a previous layer and an operation of a plurality of weights.

The learning algorithm is a method for training a predetermined target device, such as a robot without limitation thereto, using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 1 shows various hardware components of one embodiment of the electronic device (100), it is to be understood that other embodiments are not limited thereto. In other embodiments, the electronic device (100) may include a greater or a lesser number of components. Further, the labels or names of the components are used only for illustrative purpose and do not limit the scope of the invention. One or more components can be combined together to perform a same or substantially similar function in the electronic device (100).

Figure 2:
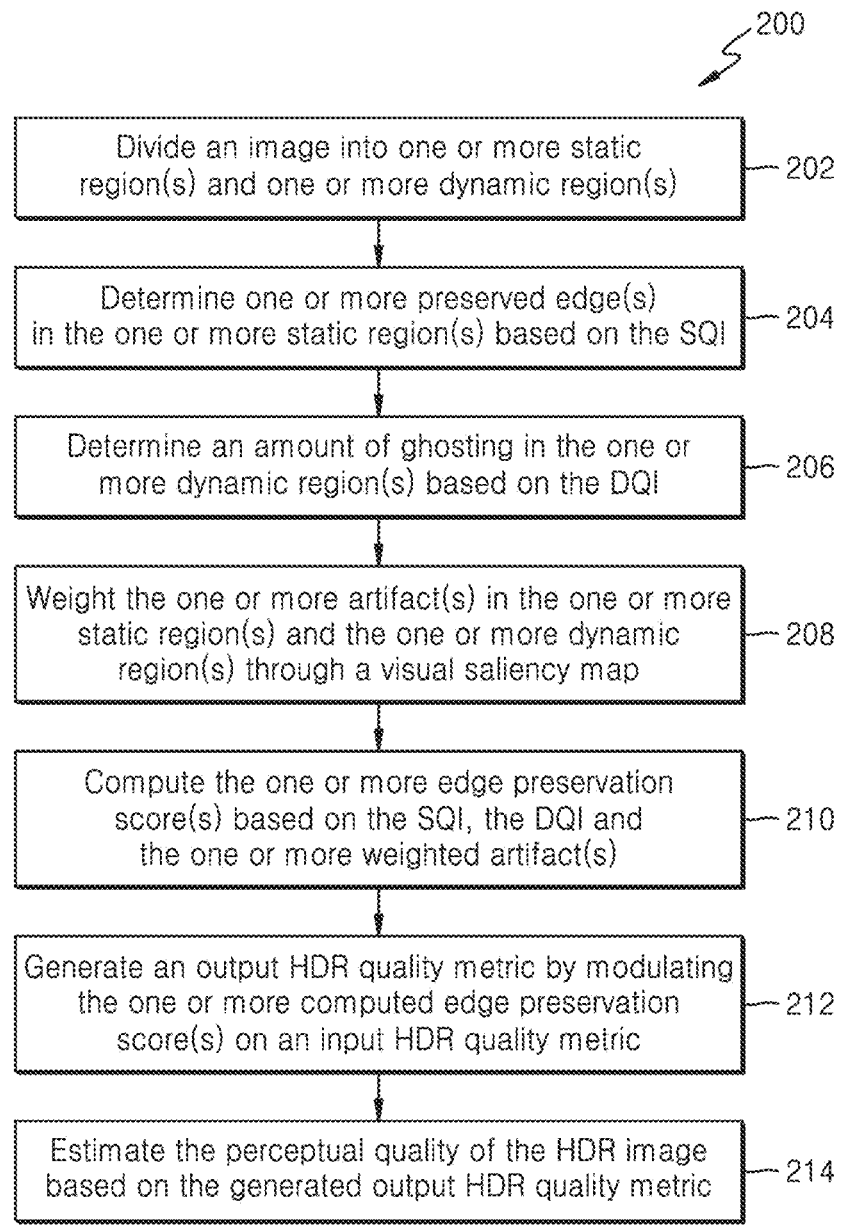
FIG. 2 is a flowchart diagram illustrating a method for estimating a perceptual quality of a High Dynamic Range (HDR) image according to an embodiment of the present disclosure.

FIG. 2 illustrates a method 200 for estimating the perceptual quality of an HDR image according to an embodiment. The operations 202 through 214 may be handled by the perceptual quality and estimation controller (140) of FIG. 1.

At step 202, the method includes dividing the image into one or more static region(s) and one or more dynamic region(s). At step 204, the method includes determining one or more preserved edge(s) in the one or more static region(s) based on an SQI. At step 206, the method includes determining an amount of ghosting in the one or more dynamic region(s) based on a DQI. At step 208, the method includes weighting one or more artifact(s) in the one or more static region(s) and the one or more dynamic region(s) through a visual saliency map. At step 210, the method includes computing one or more edge preservation score(s) based on the SQI, the DQI and the one or more weighted artifact(s). At step 212, the method includes generating an output HDR quality metric by modulating the one or more computed edge preservation score(s) on an input HDR quality metric. At step 214, the method includes estimating a perceptual quality of an HDR image based on the generated output HDR quality metric.

The disclosed method need not utilize a CNN to evaluate HDR quality of important patches predicted by the visual saliency map. The disclosed method uses edge-based metrics to evaluate HDR quality. In the disclosed method, an edge based ratio may be used to quantify ghosting in HDR images. The disclosed method can act as feedback for quality benchmarking of the HDR techniques as well as for parameter tuning of existing HDR techniques. The visual saliency map can assist in quantifying the importance of edge-artifacts. The DQI provides a useful metric by increasing sensitivity to the ghosting artifacts. The disclosed method may use low-cost edge-detection in LDR and HDR images, which can be accelerated by HardWare (HW) accelerators.

Figure 3:
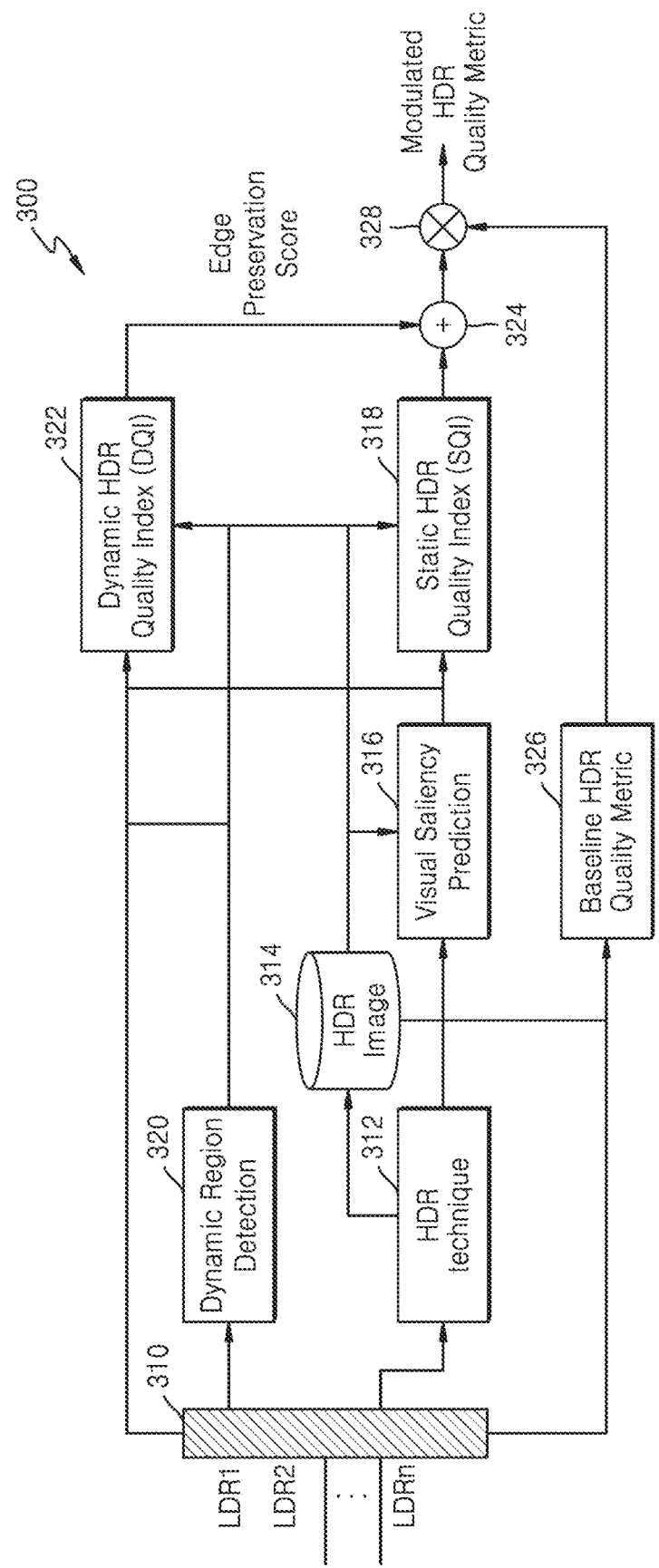
FIG. 3 is a block diagram illustrating an example in which an electronic device estimates perceptual quality of an HDR image according to an embodiment of the present disclosure.

FIG. 3 illustrates an electronic system or device 300 which estimates the perceptual quality of an HDR image according to an embodiment.

The electronic system or device 300 receives one or more LDR image(s) through an input module 310. After receiving the one or more LDR image(s), the electronic device determines one or more dynamic region(s) in a detection module 320. The electronic device determines an amount of ghosting in one or more dynamic region(s) based on a dynamic HDR quality index (DQI) module 322.

The electronic device 300 generates an HDR image by combining the one or more LDR image(s) using a selected HDR technique in a technique module 312, and stores the HDR image in a storage module 314. A visual saliency map is determined in a prediction module 316. The electronic device determines one or more preserved edge(s) in one or more static region(s) based on a static HDR quality index (SQI) module 318, which also determines the amount of ghosting in the one or more dynamic region(s) based on the DQI.

Further, the electronic device 300 computes the edge preservation score based on the SQI, the DQI and the one or more weighted artifact(s) in a summing module 324, determines a baseline HDR Quality metric at a baseline module 326, and generates the output HDR quality metric by modulating the computed edge preservation score on the baseline HDR quality metric to generate a modulated HDR quality metric at the convolution module 328. Moreover, the electronic system or device estimates a perceptual quality of the HDR image based on the modulated HDR quality metric.

Figure 4:
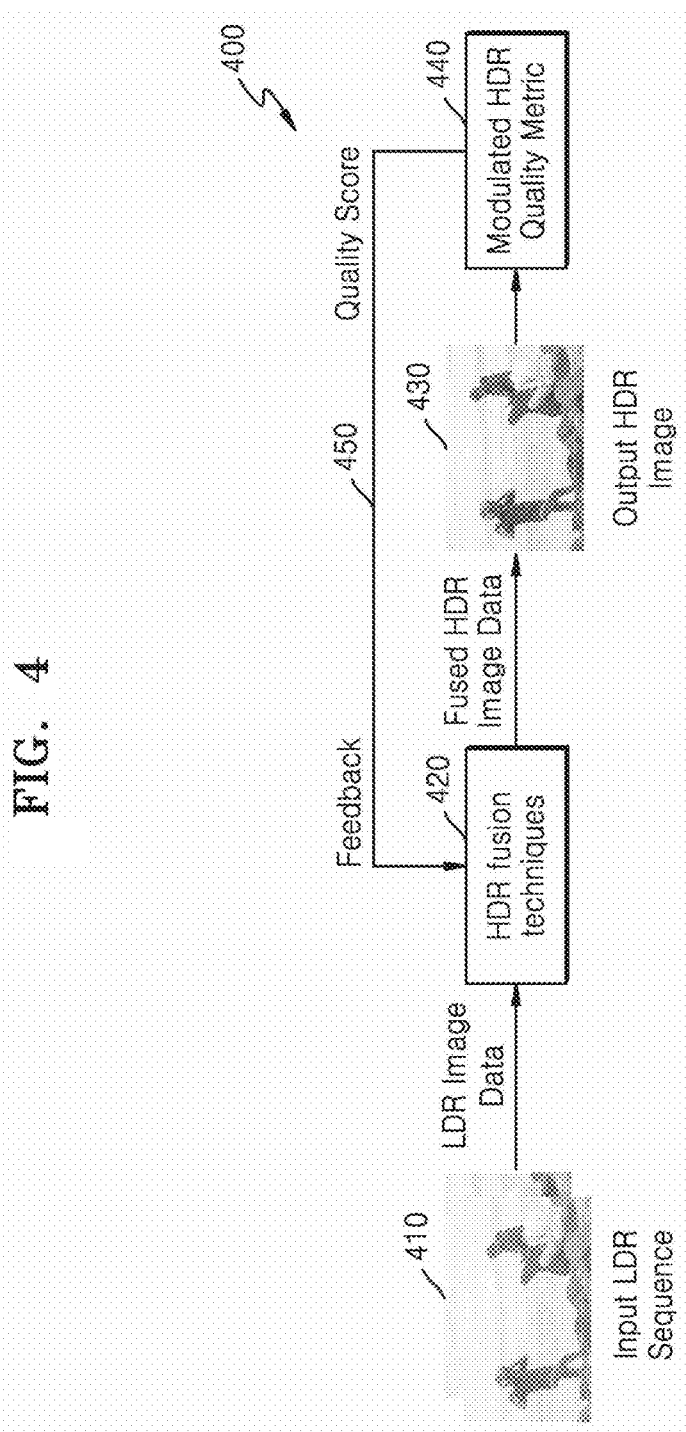
FIG. 4 is a block diagram illustrating an example in which an electronic device estimates perceptual quality of an HDR image using a quality score according to an embodiment of the present disclosure.

FIG. 4 illustrates an electronic device or system 400 which estimates the perceptual quality of an HDR image, according to an embodiment as disclosed herein. The system 400 receives as input a sequence of LDR images 410. After receiving each input LDR image in the sequence, the system generates an output HDR image using HDR fusion techniques in a fusion circuit 420. Based on the disclosed methods, the system provides fused HDR image data, may display an output HDR image 430 by using a quality score generated in a modulated HDR quality metric circuit 440, which, in turn, connects to a feedback circuit 450 that feeds back a quality score to the fusion circuit 420.

The various actions, acts, blocks, steps, or the like in the method 200 of FIG. 2 may be performed in the order presented, in a different order, or simultaneously, without limitation thereto. Further, in some embodiments, some of the actions, acts, blocks, steps, or the like may be omitted, added, modified, skipped, or the like without departing from the scope of the present disclosure.

The foregoing description of specific illustrative embodiments will so fully reveal the general nature of those disclosed herein that others can, by applying current knowledge, readily modify and/or adapt for various applications such specific embodiments without departing from the concepts of the present disclosure, and, therefore, such adaptations and modifications should and are intended to be comprehended within the meaning and range of equivalents of the disclosed and potential embodiments. It is to be understood that the phraseology or terminology employed herein is for the purpose of description and not for limitation. Therefore, while the embodiments herein have been described by way of example, those of ordinary skill in the pertinent art will recognize that the embodiments herein can be practiced with or without modification without departing from the spirit and scope of the present disclosure as described herein and set forth in the following claims.

We claim:

1. A method for estimating a perceptual quality of a high dynamic range (HDR) image by an electronic device, the method comprising:

dividing an image into at least one static region and at least one dynamic region;

determining at least one preserved edge in the at least one static region based on a static HDR quality index (SQI);

determining an amount of ghosting in the at least one dynamic region based on a dynamic HDR quality index (DQI);

weighting at least one artifact in the at least one static region and the at least one dynamic region through a visual saliency map;

computing at least one edge preservation score based on the SQI and the DQI;

generating an output HDR quality metric by modulating the at least one computed edge preservation score on an input HDR quality metric; and estimating a perceptual quality of the HDR image based on the generated output HDR quality metric.

2. The method as claimed in claim 1, further comprising applying the generated output HDR quality metric as feedback for tuning at least one parameter to optimize the perceptual quality of the HDR image.

3. The method as claimed in claim 1, wherein the SQI determines an HDR blur through at least one lost LDR edge in the at least one static region of the HDR image due to at least one of an overexposure or an underexposure.

4. The method as claimed in claim 1, wherein the DQI determines an HDR ghosting through additional edges in the at least one dynamic region of the HDR image due to a foreground motion.

5. The method as claimed in claim 1,
wherein the visual saliency map is used to weigh an edge-cost in the HDR image compared to at least one LDR image before computing the edge preservation score,
wherein the edge-cost corresponds to edge loss and a presence of extra edges in the HDR image.

6. The method as claimed in claim 1, wherein the SQI is generated by:
accumulating all edges present in the at least one static region of an input LDR sequence into one edge map;
detecting a blur in an output HDR image by computing a number of edge pixels in the accumulated edges that are not found in the output HDR image at a corresponding location;
computing the blur as a fraction of edge pixels in the accumulated edge map that are not present in the output HDR image; and
subtracting the computed blur ratio from a predefined value to obtain the SQI, wherein the predefined value is 1.

7. The method as claimed in claim 1, wherein the DQI is generated by:
counting a number of edge pixels in the at least one dynamic region for each of LDR images in the input sequence;
determining the LDR image containing a maximum number of edges;
accumulating the edges from the LDR image and the edges in the output HDR image;
detecting the at least one artifact as extra edges present in the output HDR image that are not present in the input LDR image that has the maximum number of edges; and
computing the DQI as the maximum number of edge pixels in an input sequence divided by the number of edges in the accumulated edge map, wherein the computation is always less than or equal to one, where the computation is equal to one if there are no extra edge pixels in the output HDR image.

8. An electronic device, comprising:
a processor;
a memory; and
a perceptual quality and estimation controller, coupled with the processor and the memory,
wherein the perceptual quality and estimation controller is configured to:
divide an image into at least one static region and at least one dynamic region;
determine at least one preserved edge in the at least one static region based on a static high dynamic range (HDR) quality index (SQI);
determine an amount of ghosting in the at least one dynamic region based on a dynamic HDR quality index (DQI);
weight at least one artifact in the at least one static region and the at least one dynamic region through a visual saliency map;
compute at least one edge preservation score based on the SQI and the DQI;
generate an output HDR quality metric by modulating the at least one computed edge preservation score on an input HDR quality metric; and
estimate the perceptual quality of the HDR image based on the generated output HDR quality metric.

9. The electronic device as claimed in claim 8, wherein the perceptual quality and estimation controller is configured to feedback the generated output HDR quality metric for tuning at least one parameter to optimize the perceptual quality of the HDR image.

10. The electronic device as claimed in claim 8, wherein the SQI determines an HDR blur through at least one lost LDR edge in the at least one static region of the HDR image due to one of an overexposure or an underexposure.

11. The electronic device as claimed in claim 8, wherein the DQI determines a HDR ghosting through additional edges in the at least one dynamic region of the HDR image due to a foreground motion.

12. The electronic device as claimed in claim 8, wherein the visual saliency map is used to weigh an edge-cost in the HDR image compared to at least one the LDR image before computing the edge preservation score, wherein the edge-cost corresponds to edge loss and a presence of extra edges in the HDR image.

13. The electronic device as claimed in claim 8, wherein the SQI is generated by:
accumulating all edges present in the at least one static region of an input LDR sequence into one edge map;
detecting a blur in an output HDR image by computing a number of edge pixels in the accumulated edges that are not found in the output HDR image at corresponding location;
computing the blur as a fraction of edge pixels in the accumulated edge map that are not present in the output HDR image; and
subtracting the computed blur ratio from a predefined value to obtain the SQI, wherein the predefined value is 1.

14. The electronic device as claimed in claim 8, wherein the DQI is generated by:
counting a number of edge pixels in the at least one dynamic region for each of LDR images in the input sequence;
determining the LDR image containing a maximum number of edges;
accumulating the edges from the LDR image and the edges in the output HDR image;
detecting the at least one artifact as extra edges present in the output HDR image that are not present in the input LDR image with the maximum number of edges; and
computing the DQI as the maximum number of edge pixels in the input sequence divided by the number of edges in the accumulated edge map, wherein the computation is always less than or equal to one, where the computation is equal to one if there are no extra edge pixels in the output HDR image.

15. A perceptual quality and estimation control circuit configured to process a plurality of low dynamic range (LDR) images of different exposures and generate a high dynamic range (HDR) image, the control circuit comprising:

a dynamic region detection circuit configured to divide an image into at least one static region and at least one dynamic region;

a static HDR quality index (SQI) circuit configured to determine at least one preserved edge in the at least one static region based on an SQI;

a dynamic HDR quality index (DQI) circuit configured to determine an amount of ghosting in the at least one dynamic region based on a DQI;

a visual saliency prediction circuit configured to weight at least one artifact in the at least one static region and the at least one dynamic region through a visual saliency map;

a combinatorial circuit configured to compute at least one edge preservation score based on the SQI and the DQI;

a convolutional circuit configured to generate an output HDR quality metric by modulating the at least one computed edge preservation score on an input HDR quality metric; and a feedback circuit configured to estimate and compensate the perceptual quality of the HDR image based on the generated output HDR quality metric.

16. The perceptual quality and estimation control circuit as claimed in claim 15, wherein the feedback circuit is configured to feedback the generated output HDR quality metric for tuning at least one parameter to optimize the perceptual quality of the HDR image.

17. The perceptual quality and estimation control circuit as claimed in claim 15, wherein the SQI circuit determines an HDR blur through at least one lost LDR edge in the at least one static region of the HDR image due to one of an overexposure or an underexposure.

18. The perceptual quality and estimation control circuit as claimed in claim 15,
wherein the DQI circuit determines an HDR ghosting through additional edges in the at least one dynamic region of the HDR image due to a foreground motion, wherein the visual saliency prediction circuit weighs an edge-cost in the HDR image compared to at least one of the plurality of LDR images before computing the edge preservation score, wherein the edge-cost corresponds to edge loss and a presence of extra edges in the HDR image.

19. The perceptual quality and estimation control circuit as claimed in claim 15, wherein the SQI circuit comprises:

an accumulator configured to accumulate all edges present in the at least one static region of an input LDR sequence into one edge map;

an edge detector configured to detect a blur in an output HDR image by computing a number of edge pixels in the accumulated edges that are not found in the output HDR image at corresponding location; and a processor configured to compute the blur as a fraction of edge pixels in the accumulated edge map that are not present in the output HDR image, and subtract the computed blur ratio from a predefined value to obtain the SQI.

20. The perceptual quality and estimation control circuit as claimed in claim 15, wherein the DQI circuit comprises:

a counter configured to count a number of edge pixels in the at least one dynamic regions for each of LDR images in the input sequence;

a maximizer configured to determine the LDR image containing a maximum number of edges;

an accumulator configured to accumulate the edges from the LDR image and the edges in the output HDR image;

an edge detector configured to detect the at least one artifact as extra edges present in the output HDR image that are not present in the input LDR image with the maximum number of edges; and a processor configured to compute the DQI as the maximum number of edge pixels in the plurality of LDR images divided by the number of edges in the accumulated edge map.

* * * * *